(12) United States Patent
Fujiki et al.

(10) Patent No.: US 10,483,011 B2
(45) Date of Patent: Nov. 19, 2019

(54) CONDUCTIVE COMPOSITION, CONDUCTIVE COMPOSITION PRODUCTION METHOD, ANTI-STATIC RESIN COMPOSITION AND ANTISTATIC RESIN FILM

(71) Applicants: SHIN-ETSU POLYMER CO., LTD., Tokyo (JP); NISSIN CHEMICAL INDUSTRY CO., LTD., Fukui (JP)

(72) Inventors: Hironao Fujiki, Saitama (JP); Takanori Suzuki, Fukui (JP)

(73) Assignee: SHIN-ETSU POLYMER CO., LTD., Tokyo (JP)

(*) Notice: Subject to any disclaimer, the term of this patent is extended or adjusted under 35 U.S.C. 154(b) by 0 days.

(21) Appl. No.: 14/823,652

(22) Filed: Aug. 11, 2015

(65) Prior Publication Data

US 2015/0348671 A1 Dec. 3, 2015

Related U.S. Application Data

(63) Continuation-in-part of application No. PCT/JP2014/000752, filed on Feb. 14, 2014.

(30) Foreign Application Priority Data

Feb. 15, 2013 (JP) ................. 2013-028166

(51) Int. Cl.
| | | |
|---|---|---|
| *H01B 1/00* | (2006.01) | |
| *H01B 1/12* | (2006.01) | |
| *C09D 7/40* | (2018.01) | |

(52) U.S. Cl.
CPC ............ *H01B 1/127* (2013.01); *C09D 7/40* (2018.01)

(58) Field of Classification Search
CPC .......... H01B 1/12; H01B 1/124; H01B 1/127; H01B 1/128
See application file for complete search history.

(56) References Cited

U.S. PATENT DOCUMENTS

| | | | |
|---|---|---|---|
| 5,300,575 A | 4/1994 | Jonas et al. | |
| 5,370,981 A | 12/1994 | Krafft et al. | |
| 6,632,472 B2 | 10/2003 | Louwet et al. | |
| 8,178,642 B2 | 5/2012 | Morita et al. | |
| 2006/0062958 A1 | 3/2006 | Yoshida et al. | |
| 2006/0202171 A1 | 9/2006 | Yoshida et al. | |
| 2007/0108420 A1 | 5/2007 | Kuramoto | |
| 2008/0293855 A1 | 11/2008 | Kim et al. | |
| 2010/0091432 A1 | 4/2010 | Sugawara et al. | |
| 2010/0188802 A1 | 7/2010 | Yoshida et al. | |
| 2010/0294997 A1 | 11/2010 | Yoshida et al. | |
| 2011/0026120 A1 | 2/2011 | Suzuki et al. | |
| 2011/0049435 A1 | 3/2011 | Wakizaka et al. | |
| 2011/0175036 A1 | 7/2011 | Masahiro et al. | |
| 2015/0029642 A1 | 1/2015 | Shi et al. | |
| 2015/0348670 A1 | 12/2015 | Fujiki | |
| 2015/0348671 A1 | 12/2015 | Fujiki et al. | |

FOREIGN PATENT DOCUMENTS

| | | |
|---|---|---|
| CN | 1439029 A | 8/2003 |
| CN | 101727999 A | 6/2010 |
| EP | 2338939 A1 | 6/2001 |
| EP | 2 957 597 A | 12/2015 |
| JP | 07-090060 | 4/1995 |
| JP | 07-165892 | 6/1995 |
| JP | 2002-241613 A | 8/2002 |
| JP | 2003-251756 A | 9/2003 |
| JP | 2004-502004 A | 1/2004 |
| JP | 2005-170996 A | 6/2005 |
| JP | 2006-028439 A | 2/2006 |
| JP | 2006-249303 A | 9/2006 |
| JP | 2007-254730 A | 10/2007 |
| JP | 2007-308549 A | 11/2007 |
| JP | 2008-045061 A | 2/2008 |
| JP | 2008-045116 A | 2/2008 |
| JP | 2008-133415 A | 6/2008 |
| JP | 2010-070723 A | 4/2010 |
| JP | 2010-077186 A | 4/2010 |
| JP | 2010-095580 A | 4/2010 |
| JP | 2010-159365 A | 7/2010 |
| JP | 2011-001396 A1 | 1/2011 |
| JP | 2011032382 A | 2/2011 |
| JP | 2011-048359 A | 3/2011 |
| JP | 2012-097227 A | 5/2012 |
| JP | 2012-241130 A | 12/2012 |
| JP | 2016-017114 A | 2/2016 |
| JP | 2016-017115 A | 2/2016 |
| JP | 2016-023202 A | 2/2016 |
| JP | 2016-023287 A | 2/2016 |

(Continued)

OTHER PUBLICATIONS

Aug. 9, 2016 Japanese Office Action, that issued in Japanese Patent Application No. 2015-500150.
Jan. 20, 2015 Taiwanese Office Action, that issued in TW Patent Application No. 103104972.
International Search Report of PCT/JP2014/000751 dated May 27, 2014.

(Continued)

*Primary Examiner* — Haidung D Nguyen
(74) *Attorney, Agent, or Firm* — Cowan, Liebowitz & Latman, P.C.; Mark Montague

(57) ABSTRACT

A transparent conductive film with fewer problems originating from amine compounds is provided using a conductive composition stably and pseudo-solubly dispersed in a solvent consisting mainly of an organic solvent. This invention relates to: a conductive composition which is pseudo-solubly dispersed in a solvent consisting mainly of an organic solvent and which contains (a) a π-conjugated conductive polymer, (b) polyanions doping the π-conjugated conductive polymer (a), and (c) a reaction product of those anions of the polyanions (b) that were not needed for doping, and an oxirane group- and/or oxetane group-containing organic compound; a production method of said conductive composition; an anti-static resin composition formed by mixing said conductive composition and a resin solution dissolved in an organic solvent; and antistatic resin film formed by curing said antistatic resin composition.

7 Claims, No Drawings

(56) References Cited

FOREIGN PATENT DOCUMENTS

| | | | |
|---|---|---|---|
| JP | 2016-023288 A | 2/2016 |
| JP | 2016-145302 A | 8/2016 |
| JP | 2017-025262 A | 2/2017 |
| KR | 10-2007-0056071 A | 5/2007 |
| TW | 200624494 A | 7/2006 |
| WO | 02/00759 A1 | 1/2002 |
| WO | 03/048229 A1 | 6/2003 |
| WO | 2005/052058 A1 | 6/2005 |
| WO | 2006/033388 A1 | 3/2006 |
| WO | 2014/125826 A1 | 8/2014 |
| WO | 2014/125827 A1 | 8/2014 |

OTHER PUBLICATIONS

Jan. 20, 2015 Taiwanese Office Action, that issued in Taiwanese Patent Application No. 103104973.0.
Jul. 5, 2016 Chinese Office Action, that issued in Chinese Patent Application No. 201480007499.7.
Jul. 5, 2016 European Search Report, that issued in European Patent Application No. 14751210.
Jul. 19, 2016 Chinese Office Action, that issued in Chinese Patent Application No. 201480007498.2.
International Search Report, that issued in the corresponding PCT Patent Application No. 2014/000752.
Aug. 19, 2016 Annex to the Supplemental European Search Report, that issued in EP Patent Application No. 14 75 1614.0.
Japanese Notification of Reasons for Refusal dated Nov. 8, 2016, which is enclosed with an English Translation, that issued in Japanese Patent Application No. 2015-500150.

CONDUCTIVE COMPOSITION, CONDUCTIVE COMPOSITION PRODUCTION METHOD, ANTI-STATIC RESIN COMPOSITION AND ANTISTATIC RESIN FILM

CROSS REFERENCE TO RELATED APPLICATIONS

The present application is a continuation-in-part of International Application PCT/JP2014/000752, which claims priority to on Japanese Patent Application No. 2013-028166 filed on Feb. 15, 2013. The entire content of each of these applications is incorporated herein by reference. In addition, the contents described in patents, patent applications and Literatures cited in the present application are incorporated herein by reference.

BACKGROUND OF THE INVENTION

1. Technical Field

The present invention relates to a conductive composition that contains a π-conjugated conductive polymer and that is dispersible and soluble in a solvent, a production method thereof, an antistatic resin composition obtained by mixing the conductive composition with a resin component, and an antistatic resin film obtained by curing the antistatic resin composition.

2. Related Art

A π-conjugated conductive polymer whose main chain includes a conjugated system containing π electrons is generally synthesized by an electropolymerization method or a chemical oxidative polymerization method. In the electropolymerization method, a mixed solution of an electrolyte serving as a dopant and a precursor monomer for formation of a π-conjugated conductive polymer is prepared, electrodes are placed in the solution and also a support such as an electrode material formed in advance is immersed therein, and a voltage is applied between the electrodes to thereby form a π-conjugated conductive polymer in the form of a film on the surface of the support. The electropolymerization method is thus needed to use an apparatus for electropolymerization and is performed by batch production, and therefore is poor in mass productivity. On the other hand, in the chemical oxidative polymerization method, there are no such limitations as described above, and an oxidant and an oxidative polymerization catalyst can be added to a precursor monomer for formation of a π-conjugated conductive polymer, to thereby produce a large amount of a π-conjugated conductive polymer in a solution.

In the chemical oxidative polymerization method, however, as the conjugated system of the main chain forming the π-conjugated conductive polymer is grown, the π-conjugated conductive polymer is poorer in solubility in a solvent, and therefore is obtained in the form of a solid powder that is insoluble in a solvent. Therefore, it is difficult to form a film of the π-conjugated conductive polymer, having a uniform thickness, on various substrates such as a plastic substrate by a procedure such as coating. There have been attempted based on such reasons a method of introducing a functional group to the π-conjugated conductive polymer to allow the polymer to be solubilized in a solvent, a method of dispersing the π-conjugated conductive polymer in a binder resin to allow the polymer to be solubilized in a solvent, a method of adding an anion group-containing polymeric acid to the π-conjugated conductive polymer to allow the polymer to be solubilized in a solvent, and the like.

For example, in order to enhance the solubility of the π-conjugated conductive polymer in water, there is known a method of subjecting 3,4-dialkoxythiophene to chemical oxidative polymerization using an oxidant in the presence of polystyrenesulfonic acid having a molecular weight of 2,000 to 500,000 as the anion group-containing polymeric acid, to produce an aqueous poly(3,4-dialkoxythiophene) solution (see, for example, Patent Literature 1). There is also known a method of subjecting a precursor monomer for formation of the π-conjugated conductive polymer to chemical oxidative polymerization in the presence of polyacrylic acid, to produce an aqueous colloidal π-conjugated conductive polymer solution (see, for example, Patent Literature 2).

Furthermore, there is also proposed a method of producing a conductive solution that can be solubilized or dispersed in an organic solvent to be mixed with an organic resin. As one example thereof, there are known a solution of polyaniline in an organic solvent, and a production method thereof (see, for example, Patent Literature 3). There is also known a solvent replacement method by phase transition from a solution containing a polyanion and a true conductive polymer in water to an organic solvent (see, for example, Patent Literature 4, Patent Literature 5, Patent Literature 6 and Patent Literature 7). There is also known a method of dissolving a freeze-dried true conductive polymer in an organic solvent (see, for example, Patent Literature 8). These methods, however, have the problem of mixing with other organic resin as in the example of polyaniline, and additionally the problem of limitation to a solvent system containing a large amount of water. Even when a small amount of water or substantially no water is contained, there is the following problem: an amine compound is used to thereby cause color tone to be deteriorated over time in the case of mixing with the resin, and cause doping of the conductive polymer with the polyanion to be gradually withdrawn by amine, resulting in deterioration in conductivity over time, as in the cases of the above Literatures (see, for example, Patent Literature 4, Patent Literature 5, Patent Literature 6 and Patent Literature 7).

In the case of imparting conductivity to a resin where an isocyanate type compound is used, as a characteristic example, there is the following disadvantage: aggregation of a conductive polymer due to amine occurs. Furthermore, if a conductive polymer is mixed with an addition curing type silicone resin, there is the following disadvantage: curing inhibition due to amine occurs to cause curing of a silicone resin to be insufficient.

As described above, there has been heretofore proposed a conductive polymer solution including a π-conjugated conductive polymer, which is a conductive solution that is an aqueous solution, a part or all of which is displaced with an organic solvent, by the prior arts (techniques disclosed in Patent Literatures 1 to 8).

CITATION LIST

Patent Literature

Patent Literature 1: Japanese Patent Laid-Open No. 07-090060
Patent Literature 2: Japanese Patent Laid-Open No. 07-165892
Patent Literature 3: International Publication No. WO2005/052058
Patent Literature 4: Japanese Patent Laid-Open No. 2006-249303

Patent Literature 5: Japanese Patent Laid-Open No. 2007-254730

Patent Literature 6: Japanese Patent Laid-Open No. 2008-045061

Patent Literature 7: Japanese Patent Laid-Open No. 2008-045116

Patent Literature 8: Japanese Patent Laid-Open No. 2011-032382

SUMMARY OF THE INVENTION

All the conventional techniques described above, however, cannot overcome the above disadvantages derived from an amine type compound because of using an amine type compound for phase transition of the conductive polymer from an aqueous phase to an organic phase.

An object of the present invention is to use a conductive composition that is stably dispersible and soluble in a solvent mainly containing an organic solvent, to form a transparent conductive film that less causes the problems derived from an amine type compound.

In order to achieve the above object, the present inventors have developed a completely new technique in which no amine type compound is used and an oxirane type or oxetane type compound is used to enable phase transition from an aqueous phase to an organic phase, thereby leading to completion of the present invention. Specific solutions to the problems are as follows.

A conductive composition of an embodiment of the present invention, for achieving the above object, is a composition that includes (a) a π-conjugated conductive polymer, (b) a polyanion with which the π-conjugated conductive polymer (a) is doped, and (c) a reaction product of an anion other than the anion required for doping in the polyanion (b) with an oxirane group and/or oxetane group-containing organic compound, and that is to be dispersed and solubilized in a solvent mainly containing an organic solvent.

Another embodiment provides the conductive composition, in particular, in which the solvent contains an organic solvent and water in a weight ratio ranging from 90:10 to 100:0.

Another embodiment provides the conductive composition obtained by further adding (d) an organic solvent.

Another embodiment provides the conductive composition further including (e) a resin that is soluble in the organic solvent.

Another embodiment provides the conductive composition, in particular, in which the π-conjugated conductive polymer (a) has one or more repeating unit selected from the group consisting of polypyrroles, polythiophenes, polyacetylenes, polyphenylenes, polyphenylenevinylenes, polyanilines, polyacenes, polythiophenevinylenes, and copolymers of two or more thereof.

Another embodiment provides the conductive composition, furthermore, in which the π-conjugated conductive polymer (a) is poly(3,4-ethylenedioxythiophene) or polypyrrole.

Another embodiment provides the conductive composition, in addition, in which the polyanion (b) includes one or a mixture of two or more selected from a sulfonic acid group, a phosphoric acid group and a carboxyl group.

Another embodiment provides the conductive composition, in addition, in which the polyanion (b) includes polystyrenesulfonic acid, polyvinylsulfonic acid, polyacryloyloxy-alkylenesulfonic acid, poly(2-acrylamide-2-methyl-1-propanesulfonic acid), or one or more thereof as a copolymerization constituent.

A method for producing a conductive composition of an embodiment of the present invention is a method for producing any of the above conductive compositions, the method including a step of adding an oxirane group and/or oxetane group-containing organic compound to a water dispersion of a π-conjugated conductive polymer and a polyanion with which the polymer is doped, reacting the polyanion and the oxirane group and/or oxetane group-containing organic compound, and removing at least moisture.

A method for producing a conductive composition of an embodiment of the present invention is a method for producing any of the above conductive compositions, the method including a step of adding an oxirane group and/or oxetane group-containing organic compound to a water dispersion of a π-conjugated conductive polymer and a polyanion with which the polymer is doped, performing phase transition to a water-insoluble organic solvent after or while reacting the polyanion and the oxirane group and/or oxetane group-containing organic compound, and removing at least moisture.

A method for producing a conductive composition of an embodiment of the present invention is a method for producing any of the above conductive compositions, the method including a step of adding an oxirane group and/or oxetane group-containing organic compound to a dry solid of a π-conjugated conductive polymer with moisture reduced in advance, and a polyanion with which the polymer is doped, and reacting the polyanion and the oxirane group and/or oxetane group-containing organic compound.

An antistatic resin composition of an embodiment of the present invention is obtained by mixing any of the above conductive compositions with a resin solution dissolved in an organic solvent.

An antistatic resin film of an embodiment of the present invention is obtained by reducing an organic solvent from the antistatic resin composition and curing the resulting composition.

According to the present invention, a conductive composition that is to be stably dispersed and solubilized in a solvent mainly containing an organic solvent can be used to form a transparent conductive film that less causes the problems derived from an amine type compound.

DETAILED DESCRIPTION OF THE PRESENT INVENTION

Hereinafter, respective embodiments of the conductive composition and the production method thereof, and the antistatic resin composition and the antistatic resin film including the conductive composition, of the present invention, are described.

<A Embodiments of Conductive Composition and Production Method Thereof>

1. Conductive Composition

A conductive composition of an embodiment of the present invention includes (a) a π-conjugated conductive polymer, (b) a polyanion with which the π-conjugated conductive polymer (a) is doped, and (c) a reaction product of an anion in the polyanion with an oxirane group and/or oxetane group-containing organic compound, and is dispersed and solubilized in a solvent mainly containing an organic solvent. A true conductive polymer doped with, as a dopant, a polyanion for use in the present application is formed from a fine particle having a particle size of about several tens nanometers. Such a fine particle is transparent in a visible light region due to the presence of the polyanion, also serving as a surfactant, and appears to be dissolved in the solvent. The fine particle is actually dispersed in the solvent, but such a state is referred to as "dispersed and solubilized" in the present application. The solvent is a solvent mainly containing an organic solvent. The phrase "mainly containing an organic solvent" here means that the content of an organic solvent in the solvent is more than 50%. In particular, the solvent preferably contains an organic solvent and water in a weight ratio ranging from 90:10 to 100:0.

1.1 Production Method

The conductive composition of the embodiment can be produced by the following method as an example.

(1) Production Method from Solution of Conductive Polymer/Polyanion Complex Water Dispersion A conductive polymer/polyanion complex water dispersion is obtained by subjecting an aqueous solution or a water dispersion, in which a monomer for the conductive polymer and a dopant coexist, to polymerization in the presence of an oxidant. Herein, not only polymerization of such a monomer is performed, but also a commercially available conductive polymer/dopant water dispersion may be used. Examples of the commercially available conductive polymer/dopant water dispersion can include a PEDOT/PSS water dispersion (product name: Clevios) from Heraeus Holding and a PEDOT/PSS water dispersion (product name: Orgacon) from Agfa-Gevaert Group.

The conductive composition is obtained by adding to the water dispersion an oxirane group or oxetane group-containing compound together with a solvent, then reacting an anion with an oxirane group or oxetane group, and thereafter subjecting a reaction liquid to concentration, separation by filtering, or concentration to dryness. Thereafter, suitably, the resulting concentrate or solid is solubilized or dispersed in the solvent mainly containing an organic solvent and used in the form of a coating material. The conductive composition may also be solubilized or dispersed in the solvent mainly containing an organic solvent after a step of adding to the water dispersion an oxirane group or oxetane group-containing compound together with a solvent, then adding a water-insoluble organic solvent thereto to perform phase transition of the conductive composition to a water-insoluble solvent phase (also referred to as "organic phase") during or after a reaction of an anion with an oxirane or oxetane group, and if necessary subjecting the resultant to a dehydration step or the like.

(2) Production Method from Freeze-Dried Conductive Polymer/Polyanion Complex Solid An appropriate amount of water and/or a solvent for dissolving the oxirane group or oxetane group-containing compound is added to the conductive composition that is in the form of the polyanion with which the π-conjugated conductive polymer solidified is doped, and thereafter an anion is reacted with an oxirane group or oxetane group. Thereafter, a reaction liquid is subjected to concentration, separation by filtering, or concentration to dryness, to provide the conductive composition. Thereafter, suitably, the resulting concentrate or solid is solubilized or dispersed in the solvent mainly containing an organic solvent and used in the form of a coating material. The conductive composition may also be solubilized or dispersed in the solvent mainly containing an organic solvent in the above production after a step of reacting an anion with an oxirane group or oxetane group, then adding a water-insoluble organic solvent thereto to perform phase transition of the conductive composition to a water-insoluble solvent phase, and if necessary subjecting the resultant to a dehydration step or the like. In the method (2), the freeze-dried conductive composition solid is thus used as a raw material, and therefore the time for the concentration step can be particularly shortened.

1.2 Raw Material for Conductive Composition (a) π-Conjugated Conductive Polymer

As the π-conjugated conductive polymer, an organic polymer can be used without any limitation as long as the main chain thereof includes a π-conjugated system. Examples can suitably include polypyrroles, polythiophenes, polyacetylenes, polyphenylenes, polyphenylenevinylenes, polyanilines, polyacenes, polythiophenevinylenes, and copolymers of two or more thereof. In particular, polypyrroles, polythiophenes or polyanilines can be suitably used in terms of ease of polymerization and stability in the air. While the π-conjugated conductive polymer is sufficiently high in conductivity and compatibility with a binder even when being not substituted, a functional group such as an alkyl group, an alkenyl group, a carboxyl group, a sulfo group, an alkoxyl group, a hydroxyl group, or a cyano group may be introduced in order to enhance conductivity, and dispersibility or solubility in a binder.

Suitable examples of the π-conjugated conductive polymer include polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), poly(3-methyl-4-hexyloxypyrrole), polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-anilinesulfonic acid), and poly(3-anilinesulfonic acid).

Among the examples of the π-conjugated conductive polymer, one or a copolymer of two or more selected from polypyrrole, polythiophene, poly(N-methylpyrrole), poly(3-methoxythiophene) and poly(3,4-ethylenedioxythiophene)

can be particularly suitably used in view of resistivity or reactivity. Furthermore, polypyrrole or poly(3,4-ethylenedioxythiophene) can be suitably used from the viewpoints of a high conductivity and a high heat resistance. Moreover, an alkyl-substituted compound such as poly(N-methylpyrrole) or poly(3-methylthiophene) can be more suitably used in order to enhance the solubility in the solvent mainly containing an organic solvent, and compatibility and dispersibility in the case of adding a hydrophobic resin. Among alkyl groups, a methyl group is more preferable because of less adversely affecting conductivity.

(b) Polyanion

As the polyanion, any anionic compound can be used without any particular limitation. The anionic compound is a compound having in its molecule an anion group with which the π-conjugated conductive polymer (a) can be doped by chemical oxidation. As the anion group, a sulfate group, a phosphate group, a phosphoric acid group, a carboxyl group, a sulfo group, or the like is preferable from the viewpoints of ease of production and a high stability. Among these anion groups, a sulfo group, a sulfate group, or a carboxyl group is more preferable because of being in excellent in the effect of doping the π-conjugated conductive polymer (a).

Examples of the polyanion can include a polymer obtained by polymerization of an anion group-containing polymerizable monomer, in addition to a polymer having an anion group introduced thereto by sulfonating an anion group-free polymer by a sulfonating agent. The polyanion is usually preferably obtained by polymerization of an anion group-containing polymerizable monomer from the viewpoint of ease of production. Examples of the method for producing such a polyanion can include a method in which the polyanion is obtained by oxidative polymerization or radical polymerization of an anion group-containing polymerizable monomer in a solvent in the presence of an oxidant and/or a polymerization catalyst. More specifically, a predetermined amount of an anion group-containing polymerizable monomer is dissolved in a solvent, the solution is kept at a certain temperature, and a solution in which a predetermined amount of an oxidant and/or a polymerization catalyst is dissolved in a solvent in advance is added thereto and reacted for a predetermined time. The polymer obtained by the reaction is adjusted so as to have a certain concentration by a catalyst. The production method can also allow the anion group-containing polymerizable monomer to be copolymerized with an anion group-free polymerizable monomer. The oxidant and/or the oxidation catalyst, and the solvent for use in polymerization of the anion group-containing polymerizable monomer are the same as those for use in polymerization of the precursor monomer for forming the π-conjugated conductive polymer (a).

The anion group-containing polymerizable monomer is a monomer having in its molecular a functional group that can be polymerized with the anion group, and specific examples thereof include vinylsulfonic acid and salts thereof, allylsulfonic acid and salts thereof, methallylsulfonic acid and salts thereof, styrenesulfonic acid and salts thereof, methallyloxybenzenesulfonic acid and salts thereof, allyloxybenzenesulfonic acid and salts thereof, α-methylstyrenesulfonic acid and salts thereof, acrylamido-t-butylsulfonic acid and salts thereof, 2-acrylamido-2-methylpropanesulfonic acid and salts thereof, cyclobutene-3-sulfonic acid and salts thereof, isoprenesulfonic acid and salts thereof, 1,3-butadiene-1-sulfonic acid and salts thereof, 1-methyl-1,3-butadiene-2-sulfonic acid and salts thereof, 1-methyl-1,3-butadiene-4-sulfonic acid and salts thereof, acryloyloxy-ethylsulfonic acid ($CH_2CH-COO-(CH_2)_2-SO_3H$) and salts thereof, acryloyloxy-propylsulfonic acid ($CH_2CH-COO-(CH_2)_3-SO_3H$) and salts thereof, acryloyloxy-t-butylsulfonic acid ($CH_2CH-COO-C(CH_3)_2CH_2-SO_3H$) and salts thereof, acryloyloxy-n-butylsulfonic acid ($CH_2CH-COO-(CH_2)_4-SO_3H$) and salts thereof, 3-butenoyloxy ethylsulfonic acid ($CH_2CHCH_2-COO-(CH_2)_2-SO_3H$) and salts thereof, 3-butenoyloxy-t-butylsulfonic acid ($CH_2CHCH_2-COO-C(CH_3)_2CH_2-SO_3H$) and salts thereof, 4-pentenoyloxy ethylsulfonic acid ($CH_2CH(CH_2)_2-COO-(CH_2)_2-SO_3H$) and salts thereof, 4-pentenoyloxy propylsulfonic acid ($CH_2CH(CH_2)_2-COO-(CH_2)_3-SO_3H$) and salts thereof, 4-pentenoyloxy-n-butylsulfonic acid ($CH_2CH(CH_2)_2-COO-(CH_2)_4-SO_3H$) and salts thereof, 4-pentenoyloxy-t-butylsulfonic acid ($CH_2CH(CH_2)_2-COO-C(CH_3)_2CH_2-SO_3H$) and salts thereof, 4-pentenoyloxy phenylenesulfonic acid ($CH_2CH(CH_2)_2-COO-C_6H_4-SO_3H$) and salts thereof, 4-pentenoyloxy naphthalenesulfonic acid ($CH_2CH(CH_2)_2-COO-C_{10}H_8-SO_3H$) and salts thereof, methacryloyloxy-ethylsulfonic acid ($CH_2C(CH_3)-COO-(CH_2)_2-SO_3H$) and salts thereof, methacryloyloxy-propylsulfonic acid ($CH_2C(CH_3)-COO-(CH_2)_3-SO_3H$) and salts thereof, methacryloyloxy-t-butylsulfonic acid ($CH_2C(CH_3)-COO-C(CH_3)_2CH_2-SO_3H$) and salts thereof, methacryloyloxy-n-butylsulfonic acid ($CH_2C(CH_3)-COO-(CH_2)_4-SO_3H$) and salts thereof, methacryloyloxy-phenylenesulfonic acid ($CH_2C(CH_3)-COO-C_6H_4-SO_3H$) and salts thereof, and methacryloyloxy-naphthalenesulfonic acid ($CH_2C(CH_3)-COO-C_{10}H_8-SO_3H$) and salts thereof. The anion group-containing polymerizable monomer may be a copolymer including two or more thereof.

Examples of the anion group-free polymerizable monomer include ethylene, propene, 1-butene, 2-butene, 1-pentene, 2-pentene, 1-hexene, 2-hexene, styrene, p-methylstyrene, p-ethylstyrene, p-butylstyrene, 2,4,6-trimethylstyrene, p-methoxystyrene, α-methylstyrene, 2-vinylnaphthalene, 6-methyl-2-vinylnaphthalene, 1-vinylimidazole, vinylpyridine, vinyl acetate, acrylaldehyde, acrylonitrile, N-vinyl-2-pyrrolidone, N-vinylacetamide, N-vinylformamide, N-vinylimidazole, acrylamide, N,N-dimethylacrylamide, acrylic acid, methyl acrylate, ethyl acrylate, propyl acrylate, n-butyl acrylate, isobutyl acrylate, t-butyl acrylate, isooctyl acrylate, isononylbutyl acrylate, lauryl acrylate, allyl acrylate, stearyl acrylate, isobonyl acrylate, cyclohexyl acrylate, benzyl acrylate, ethylcarbitol acrylate, phenoxyethyl acrylate, hydroxyethyl acrylate, methoxyethyl acrylate, ethoxyethyl acrylate, methoxybutyl acrylate, methacrylic acid, methyl methacrylate, ethyl methacrylate, n-butyl methacrylate, isobutyl methacrylate, t-butyl methacrylate, 2-ethylhexyl methacrylate, lauryl methacrylate, tridecyl methacrylate, stearyl methacrylate, cyclohexyl methacrylate, benzyl methacrylate, 2-hydroxyethyl methacrylate, 2-hydroxypropyl methacrylate, acryloylmorpholine, vinylamine, N,N-dimethylvinylamine, N,N-diethylvinylamine, N,N-dibutylvinylamine, N,N-di-t-butylvinylamine, N,N-diphenylvinylamine, N-vinylcarbazole, vinyl alcohol, vinyl chloride, vinyl fluoride, methyl vinyl ether, ethyl vinyl ether, cyclopropene, cyclobutene, cyclopentene, cyclohexene, cycloheptene, cyclooctene, 2-methylcyclohexene, vinylphenol, 1,3-butadiene, 1-methyl-1,3-butadiene, 2-methyl-1,3-butadiene, 1,4-dimethyl-1,3-butadiene, 1,2-dimethyl-1,3-butadiene, 1,3-dimethyl-1,3-butadiene, 1-octyl-1,3-butadiene, 2-octyl-1,3-butadiene, 1-phenyl-1,3-butadiene, 2-phenyl-1,3-butadiene, 1-hydroxy-1,3-butadiene, and 2-hydroxy-1,3-butadiene.

The degree of polymerization of the polyanion thus obtained is not particularly limited, and the number of monomer units is usually about 10 to 100,000, more preferably about 50 to 10,000, from the viewpoint of improving solubilization in a solvent, dispersibility and conductivity.

Specific examples of the polyanion can suitably include polyvinylsulfonic acid, polystyrenesulfonic acid, polyisoprenesulfonic acid, polyacryloyloxy-ethylsulfonic acid, polyacryloyloxy-butylsulfonic acid, and poly(2-acrylamido-2-methyl-1-propanesulfonic acid).

When the resulting anionic compound is an anion salt, the anion salt is preferably modified to an anionic acid. The method for modifying the anion salt to an anionic acid can include an ion-exchange method using an ion-exchange resin, a dialysis method, and an ultrafiltration method. Among these methods, an ultrafiltration method is preferable in terms of ease of operation. When a reduction in metal ion concentration is required, an ion-exchange method is used.

As a combination of the π-conjugated conductive polymer (a) and the polyanion (b), one selected from the respective groups of (a) and (b) can be used, and a combination of poly(3,4-ethylenedioxythiophene) as one example of the π-conjugated conductive polymer (a) and polystyrenesulfonic acid as one example of the polyanion (b) is preferable in terms of chemical stability, conductivity, preservation stability, and availability. Poly(3,4-ethylenedioxythiophene) and polystyrenesulfonic acid may also be each synthesized by subjecting an aqueous solution or a water dispersion liquid, in which a monomer for the conductive polymer and a dopant coexist, to polymerization in the presence of an oxidant, as described above. A commercially available conductive polymer/dopant water dispersion may also be used.

The content of the polyanion is preferably in the range from 0.1 to 10 g, more preferably 1 to 7 g based on 1 g of the π-conjugated conductive polymer. When the content of the polyanion is 0.1 g or more based on 1 g of the π-conjugated conductive polymer, the effect of doping the π-conjugated conductive polymer can be increased to result in an increase in conductivity. Additionally, solubility in a solvent is increased to allow a solution of the conductive polymer uniformly dispersed to be easily obtained. On the other hand, when the content of the polyanion is 10 g or less based on 1 g of the π-conjugated conductive polymer, the content of the π-conjugated conductive polymer can be relatively increased to allow a higher conductivity to be exhibited.

(c) Reaction Product of Anion Other than Anion Required for Doping in Polyanion with Oxirane Group and/or Oxetane Group-Containing Organic Compound The reaction product of an anion other than the anion required for doping in the polyanion with an oxirane group and/or oxetane group-containing organic compound is obtained by adding the oxirane group and/or oxetane group-containing organic compound to the π-conjugated conductive polymer (a) and the polyanion (b).

The oxirane group and/or oxetane group-containing organic compound is not particularly limited as long as it can be coordinated or bound to an anion group or an electron attracting group in the polyanion. A compound containing one or less oxirane group or oxetane group in one molecule is more preferable from the viewpoint that aggregation or gelation can be decreased. The molecular weight of the oxirane group and/or oxetane group-containing organic compound preferably ranges from 50 to 2,000 in terms of ease of dissolution in an organic solvent.

The amount of the oxirane group and/or oxetane group-containing organic compound is preferably 0.1 to 50, more preferably 1.0 to 30.0 in a weight ratio relative to the anion group or the electron attracting group in the polyanion of the π-conjugated conductive polymer. When the amount of the oxirane group and/or oxetane group-containing organic compound is 0.1 or more in the weight ratio, the oxirane group and/or oxetane group-containing organic compound can be modified so that the anion group in the polyanion is dissolved in a solvent. On the other hand, when the amount of the oxirane group and/or oxetane group-containing organic compound is 50 or less in the weight ratio, an excess of the oxirane group and/or oxetane group-containing organic compound is hardly precipitated in a conductive polymer solution, and therefore the conductivity and mechanical properties of the resulting conductive coating film are easily prevented from being reduced.

The oxirane group and/or oxetane group-containing organic compound may be a compound having any molecular structure as long as such a compound has an oxirane group or oxetane group in its molecule. The oxirane group and/or oxetane group-containing organic compound, however, is effectively a compound having many carbon atoms in order that the compound is solubilized in a low-polarity organic solvent. A compound having 10 or more carbon atoms is suitably used. When a large amount of water is used in a production process, it is preferable not to use an alkoxysilyl group-containing compound having a functional group that is hydrolyzed or reacts with water, as much as possible. On the other hand, when the production process undergoes freeze-drying, an alkoxysilyl group-containing compound may also be used because of being dispersed and solubilized in a solvent with characteristics thereof being maintained. Conventionally, a compound having an oxirane group or an oxetane group has been added as a conductivity enhancer or a crosslinking agent to an aqueous conductive polymer solution. The differences between such a known technique and the present application are as follows: 1) a reaction product by a reaction of the polyanion simultaneously serving as a dopant and a dispersant of the conductive polymer with the oxirane group or oxetane group-containing compound is obtained, and 2) moisture is removed or reduced. These requirements 1) and 2) can be achieved to thereby exert the following effects: solubilization in the organic solvent can be achieved in the state of little moisture, and mixing with the organic resin can also be made.

Hereinafter, the oxirane group and/or oxetane group-containing organic compound is exemplified.

(Oxirane Group-Containing Compound)

Examples of a monofunctional oxirane group-containing compound can include propylene oxide, 2,3-butylene oxide, isobutylene oxide, 1,2-butylene oxide, 1,2-epoxyhexane, 1,2-epoxyheptane, 1,2-epoxypentane, 1,2-epoxyoctane, 1,2-epoxydecane, 1,3-butadiene monoxide, 1,2-epoxytetradecane, glycidyl methyl ether, 1,2-epoxyoctadecane, 1,2-epoxyhexadecane, ethyl glycidyl ether, glycidyl isopropyl ether, tert-butyl glycidyl ether, 1,2-epoxyeicosane, 2-(chloromethyl)-1,2-epoxypropane, glycidol, epichlorohydrin, epibromohydrin, butyl glycidyl ether, 1,2-epoxyhexane, 1,2-epoxy-9-decane, 2-(chloromethyl)-1,2-epoxybutane, 2-ethylhexyl glycidyl ether, 1,2-epoxy-1H,1H,2H,2H,3H,3H-trifluorobutane, allyl glycidyl ether, tetracyanoethylene oxide, glycidyl butyrate, 1,2-epoxycyclooctane, glycidyl methacrylate, 1,2-epoxycyclododecane, 1-methyl-1,2-epoxycyclohexane, 1,2-epoxycyclopentadecane, 1,2-epoxycyclopentane, 1,2-epoxycyclohexane, 1,2-epoxy-1H,1H,2H,2H,3H,3H-heptadecafluorobutane, 3,4-epoxytetrahydrofuran, glycidyl stearate, 3-glycidyl oxypropyl trimethoxysilane, epoxysuccinic acid, glycidyl phenyl ether, isophorone oxide, α-pinene oxide, 2,3-epoxynorbornene, benzyl glycidyl ether, diethoxy(3-glycidyl oxypropyl)methylsilane, 3-[2-(perfluorohexyl)ethoxy]-1,2-epoxypropane, 1,1,1,3,5,5,5-heptamethyl-3-(3-glycidyl oxypropyl)trisiloxane, 9,10-epoxy-1,5-cyclododecadiene, glycidyl 4-tert-butylbenzoate, 2,2-bis(4-glycidyloxyphenyl)propane, 2-tert-butyl-2-[2-(4-chlorophenyl)]ethyloxirane, styrene oxide, glycidyl trityl ether, 2-(3,4-epoxycyclohexyl)ethyltrimethoxysilane, 2-phenylpropylene oxide, cholesterol-5α,6α-epoxide, stilbene oxide, glycidyl p-toluenesulfonate, ethyl 3-methyl-3-phenylglycidate, N-propyl-N-(2,3-epoxypropyl)perfluoro-n-octylsulfonamide, (2S,3S)-1,2-epoxy-3-(tert-butoxycarbonylamino)-4-phenylbutane, (R)-glycidyl 3-nitrobenzenesulfonate, glycidyl 3-nitrobenzenesulfonate, parthenolide, N-glycidyl phthalimide, endrin, dieldrin, 4-glycidyloxy carbazole, and oxiranylmethyl 7,7-dimethyloctanoate.

Examples of a polyfunctional oxirane group-containing compound can include 1,7-octadiene diepoxide, neopentyl glycol diglycidyl ether, 4-butanediol diglycidyl ether, 1,2:3,4-diepoxybutane, diglycidyl 1,2-cyclohexanedicarboxylate, triglycidyl isocyanurate, neopentyl glycol diglycidyl ether, 1,2:3,4-diepoxybutane, polyethylene glycol #200 diglycidyl ether, ethylene glycol diglycidyl ether, diethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerin diglycidyl ether, trimethylol propane triglycidyl ether, and hydrogenerated bisphenol A diglycidyl ether.

(Oxetane Group-Containing Compound)

Examples of a monofunctional oxetane group-containing compound can include 3-ethyl-3-hydroxymethyloxetane (=oxetane alcohol), 2-ethylhexyloxetane, (3-ethyl-3-oxetanyl)methyl acrylate, and (3-ethyl-3-oxetanyl)methacrylate.

Examples of a polyfunctional oxetane group-containing compound can include xylylene bisoxetane, 3-ethyl-3{[(3-ethyloxetane-3-yl)methoxy]methyl}oxetane, 1,4-benzenedicarboxylic acid, and bis{[3-ethyl-3-oxetanyl]methyl}ester.

In the above conductive composition, the oxirane group or oxetane group reacts with the anion group of the polyanion, and therefore the polyanion loses hydrophilicity and exhibits lipophilicity. Accordingly, this conductive composition is solubilized or can be dispersed in an organic solvent at a high concentration.

(d) Organic Solvent

An organic solvent may or may not be included in the conductive composition of this embodiment, unlike the respective components (a) to (c). Examples of an organic solvent for use in the solvent for solubilizing or dispersing the conductive composition can suitably include polar solvents typified by N-methyl-2-pyrrolidone, N,N-dimethylformamide, N,N-dimethylacetamide, dimethylsulfoxide, hexamethylene phosphoric triamide, acetonitrile and benzonitrile; phenols typified by cresol, phenol and xylenol; alcohols typified by methanol, ethanol, propanol and butanol; ketones typified by acetone, methyl ethyl ketone and methyl isobutyl ketone; esters typified by ethyl acetate, propyl acetate and butyl acetate; hydrocarbons such as hexane, heptane, benzene, toluene and xylene; carboxylic acids typified by formic acid and acetic acid; carbonate compounds typified by ethylene carbonate and propylene carbonate; ether compounds typified by dioxane and diethyl ether; linear ethers typified by ethylene glycol dialkyl ether, propylene glycol dialkyl ether, polyethylene glycol dialkyl ether and polypropylene glycol dialkyl ether; heterocyclic compounds typified by 3-methyl-2-oxazolidinone; and nitrile compounds typified by acetonitrile, glutarodinitrile, methoxyacetonitrile, propionitrile and benzonitrile. These organic solvents may be used singly or as a mixture of two or more. Among these organic solvents, alcohols, ketones, ethers, esters, and hydrocarbons can be more suitably used in terms of ease of mixing with various organics. When the conductive composition is used to form a coating film, a solid conductive composition is dispersed and solubilized in the organic solvent to produce a coating material, and the coating material is applied to a substrate and a part or all of the organic solvent is removed. Accordingly, an organic solvent having a low boiling point is suitably selected. Thus, the drying time in coating film formation can be shortened to thereby enhance the productivity of the coating film.

(e) Resin (Binder)

The conductive composition suitably includes a resin having a function as a binder (also referred to as "binder" or "binder resin") from the viewpoints of increasing the scratch resistance and the hardness of the conductive coating film and enhancing the adhesiveness of the coating film with the substrate. The binder resin may or may not be included in the conductive composition of this embodiment, unlike the respective components (a) to (c). The binder resin may also be a thermoplastic resin, other than a heat-curable resin. The π-conjugated conductive polymer is not hydrophilic but lipophilic, and therefore is particularly easily compatible with a hydrophobic resin. Examples of the binder resin can include polyesters such as polyethylene terephthalate, polybutylene terephthalate and polyethylene naphthalate; polyimide; polyamideimide; polyamides such as polyamide 6, polyamide 6,6, polyamide 12 and polyamide 11; fluororesins such as polyvinylidene fluoride, polyvinyl fluoride, polytetrafluoroethylene, an ethylene tetrafluoroethylene copolymer and polychlorotrifluoroethylene; vinyl resins such as polyvinyl alcohol, polyvinyl ether, polyvinyl butyral, polyvinyl acetate and polyvinyl chloride; an epoxy resin; a xylene resin; an aramid resin; polyimidesilicone; polyurethane; polyurea; a melamine resin; a phenol resin; polyether; an acrylic resin; a silicone resin; a urethane resin; and copolymers and mixtures thereof.

The binder resin may be dissolved in the organic solvent, may be provided with a functional group such as a sulfonic acid group or a carboxylic acid group to be formed into an aqueous solution, or may be dispersed in water in the form of emulsion. Among such binder resins, at least any one of polyurethane, polyester, an acrylic resin, polyamide, polyimide, an epoxy resin, polyimidesilicone and a silicone resin is preferably used as a resin that is soluble in the solvent or a resin that is liquid and that can be easily mixed with the conductive composition. An acrylic resin is high in hardness and excellent in transparency, and therefore is particularly suitable in an optical filter application.

(f) Others

Examples of an additive to the solvent in which the conductive composition is solubilized or dispersed can include an additive for an enhancement in conductivity.

(Conductivity Enhancer)

Examples of a conductivity enhancer include a glycidyl compound, a polar solvent, a polyhydric aliphatic alcohol, a nitrogen-containing aromatic cyclic compound, a compound having two or more hydroxy groups, a compound having two or more carboxy groups, a compound having one or more hydroxy groups and one or more carboxy groups, and a lactam compound. Among them, a conductivity enhancer that hardly inhibits curing of a peeling component is preferable. When the conductivity enhancer hardly inhibits curing of a peeling component, a peeling agent can be prevented from being transferred on a pressure-sensitive adhesive layer of a pressure-sensitive adhesive sheet, after the pressure-sensitive adhesive layer is stacked on a peeling agent layer obtained from the antistatic peeling agent. The conductivity enhancer that hardly inhibits curing of a peeling component includes a glycidyl compound, a polar solvent, and a polyhydric aliphatic alcohol. In addition, the conductivity enhancer is preferably liquid at 25° C. When the conductivity enhancer is liquid, the transparency of the peeling agent layer formed from an antistatic peeling agent can be enhanced, and foreign materials on the pressure-sensitive adhesive layer bonded to the peeling agent layer can be prevented from being transferred.

Specific examples of the glycidyl compound include ethyl glycidyl ether, n-butyl glycidyl ether, t-butyl glycidyl ether, allyl glycidyl ether, benzylglycidyl ether, glycidyl phenyl ether, bisphenol A diglycidyl ether, glycidyl ether acrylate, and glycidyl ether methacrylate. Specific examples of the polar solvent include N-methylformamide, N-methylacrylamide, N-methylmethacrylamide, N-ethylacrylamide, N-ethylmethacrylamide, N,N-dimethylacrylamide, N,N-dimethylmethacrylamide, N,N-diethylacrylamide, N,N-diethylmethacrylamide, 2-hydroxyethylacrylamide, 2-hydroxyethylmethacrylamide, N-methylolacrylamide, N-methylolmethacrylamide, N-methyl-2-pyrrolidone, N-methylacetamide, N,N-dimethylformamide, N,N-dimethylacetamide, dimethylsulfoxide, hexamethylenephosphortriamide, N-vinylpyrrolidone, N-vinylformamide, N-vinylacetamide, methyl lactate, ethyl lactate, and propyl lactate. The polyhydric aliphatic alcohol includes ethylene glycol, diethylene glycol, propylene glycol, 1,3-butylene glycol, 1,4-butylene glycol, glycerin, diglycerin, isoprene glycol, butanediol, 1,5-pentanediol, 1,6-hexanediol, 1,9-nonanediol, neopentyl glycol, trimethylolethane, trimethylol propane, thiodiethanol, and dipropylene glycol.

The content of the conductivity enhancer is preferably 10 to 10000 parts by mass, more preferably 30 to 5000 parts by mass based on 100 parts by mass of the conductive component. When the content of the conductivity enhancer is the lower limit or more, antistatic properties can be further enhanced. On the other hand, when the content is the upper limit or less, peeling properties can be further enhanced.

<B Embodiments of Antistatic Resin Composition and Antistatic Resin Film>

1. Antistatic Resin Composition

An antistatic resin composition of an embodiment of the present invention is obtained by mixing the conductive composition with a resin solution dissolved in an organic solvent. The resin solution includes the organic solvent (d) and the resin (e). Accordingly, the antistatic resin composition includes the components (a) to (e).

2. Antistatic Resin Film

An antistatic resin film of an embodiment of the present invention is a film obtained by reducing the organic solvent from the antistatic resin composition and curing the resulting composition. When the conductive composition is solid, the antistatic resin composition (coating material) is prepared from a solution in which the conductive composition is solubilized or dispersed in the solvent mainly containing an organic solvent. In addition, when the conductive composition is in the form of a solution in which the conductive composition is solubilized or dispersed in the solvent mainly containing an organic solvent, the solution is used as it is or further diluted with an organic solvent to prepare the antistatic resin composition (coating material). The coating material is supplied onto a substrate typified by paper, plastics, iron, ceramics, or glass. Examples of the supplying method can include various methods such as a coating method using a brush or a bar coater, a dipping method of dipping the substrate in the coating material, and a spin-coating method of dropping and extending the coating material on the substrate by rotation of the substrate. Examples of the method of curing the coating material on the substrate can include a method of irradiating the coating material with light such as ultraviolet light, or electron beam to cure the coating material, in addition to a method of removing the organic solvent by heating.

As described above, the conductive composition of the embodiment includes the reaction product of an anion other than the anion required for doping in the polyanion with the oxirane group and/or oxetane group-containing organic compound, and therefore is dispersible and soluble in various solvents mainly containing an organic solvent. In addition, the above conductive composition is solubilized also in various organic resins or organic resin composition solutions, and it has the advantage of allowing each composition to have a reduced resistivity or to be electrified. Further, the conductive composition is excellent in preservation stability and electrical resistivity stability, and can also be applied in the field where amine or the like is an obstacle to reaction, as compared with a composition obtained by a conventionally known method in which solvent substitution is conducted by a reaction with a polyanion residue in a conductive polymer water dispersion liquid using an amine type compound and a phase-transfer catalyst.

EXAMPLES

Next, Production Examples and Examples of the present invention are described. The present invention, however, is not limited to the following Examples.

Production Examples (Production Example 1)—Production of Polystyrenesulfonic Acid In 1000 ml of ion-exchange water was dissolved 206 g of sodium styrene sulfonate, 1.14 g of an ammonium persulfate oxidant solution dissolved in 10 ml of water in advance was dropped thereto for 20 minutes with stirring at 80° C., and the solution was stirred for 12 hours. To the resulting sodium styrene sulfonate-containing solution was added 1000 ml of sulfuric acid diluted to 10% by mass, 1000 ml of a polystyrenesulfonic acid-containing solution was removed using an ultrafiltration method, 2000 ml of ion-exchange water was added to the residual liquid, and about 2000 ml of the solution was removed using an ultrafiltration method. The above ultrafiltration operation was repeated three times. Furthermore, about 2000 ml of ion-exchange water was added to the resulting filtrate, and about 2000 ml of the solution was removed using an ultrafiltration method. This ultrafiltration operation was repeated three times. Water in the resulting solution was removed under reduced pressure to provide a colorless solid. The weight average molecular weight of the resulting polystyrenesulfonic acid was measured with Pullulan produced by Showa Denko K.K. as a standard substance by using a HPLC (high-performance liquid chromatography) system in which a GPC (gel filtration chromatography) column was used, and as a result, was 300000.

(Production Example 2)—Production of Aqueous PEDOT-PSS Solution 3,4-Ethylenedioxythiophene (14.2 g), and a solution, in which 36.7 g of the polystyrenesulfonic acid obtained in Production Example 1 was dissolved in 2000 ml of ion-exchange water, were mixed at 20° C. While the mixed solution thus obtained was stirred with being kept at 20° C., 29.64 g of ammonium persulfate dissolved in 200 ml of ion-exchange water and 8.0 g of a ferric sulfate oxidation catalyst solution were slowly added and stirred for 3 hours for reaction. To the obtained reaction liquid was added 2000 ml of ion-exchange water, and about 2000 ml of the solution was removed using an ultrafiltration method. This operation was repeated three times. Next, 200 ml of sulfuric acid diluted to 10% by mass and 2000 ml of ion-exchange water were added to the resulting solution, about 2000 ml of the solution was removed using an ultrafiltration method, 2000 ml of ion-exchange water was added thereto, and about 2000 ml of the solution was removed using an ultrafiltration method. This operation was repeated three times. Furthermore, 2000 ml of ion-exchange water was added to the resulting solution, and about 2000 ml of the solution was removed using an ultrafiltration method. This operation was repeated five times to provide a blue aqueous solution of about 1.2% by mass of PEDOT-PSS.

(Production Example 3)—Synthesis of Polysulfoethyl Methacrylate

In 1000 ml of ion-exchange water was dissolved 216 g of sodium sulfoethyl methacrylate, 1.14 g of an ammonium persulfate oxidant solution dissolved in 10 ml of water in advance was dropped thereto for 20 minutes with stirring at 80° C., and the solution was stirred for 12 hours. To the resulting sodium sulfoethyl methacrylate-containing solution was added 1000 ml of sulfuric acid diluted to 10% by mass, 1000 ml of the polysulfoethyl methacrylate-containing solution was removed using an ultrafiltration method, 1000 ml of ion-exchange water was added to the residual liquid, and about 1000 ml of the solution was removed using an ultrafiltration method. The above ultrafiltration operation was repeated three times. Furthermore, 1000 ml of ion-exchange water was added to the resulting filtrate, and about 1000 ml of the solution was removed using an ultrafiltration method. This ultrafiltration operation was repeated three times to provide a colorless solid. The weight average molecular weight of the resulting polysulfoethyl methacrylate was measured with Pullulan produced by Showa Denko K.K. as a standard substance by using a HPLC (high-performance liquid chromatography) system in which a GPC (gel filtration chromatography) column was used, and as a result, was 300000.

(Production Example 4)—Production of Aqueous PEDOT-Polysulfoethyl Methacrylate-Dispersed Solution A solution of PEDOT doped with about 1.2% by mass blue polysulfoethyl methacrylate in water (aqueous PEDOT-polysulfoethyl methacrylate solution) was obtained under the same conditions as in Production Example 2 except that polystyrenesulfonic acid in Production Example 2 was changed to polysulfoethyl methacrylate.

Production of Conductive Composition

Example 1

Methanol (400 g) and 50 g of mixed C12/C13 higher alcohol glycidyl ether (produced by Kyoeisha Chemical Co., Ltd., Epolite M-1230) were mixed. Next, 100 g of the aqueous PEDOT-PSS solution obtained in Production Example 2 was added to the mixed solution, and stirred at room temperature to provide a navy-blue precipitate. This precipitate was recovered by filtration, and dispersed in methyl ethyl ketone to provide a solution of about 1% by mass PEDOT-PSS dispersed in methyl ethyl ketone.

Example 2

The navy-blue precipitate in Example 1 was recovered by filtration, and thereafter dried under an atmosphere of 80° C. for 12 hours. The solid obtained by drying was dispersed in methyl ethyl ketone to provide a solution of about 1% by mass PEDOT-PSS dispersed in methyl ethyl ketone.

Example 3

A solution of about 1% by mass PEDOT-PSS dispersed in methyl ethyl ketone was obtained under the same conditions as in Example 1 except that the amount of the mixed C12/C13 higher alcohol glycidyl ether in Example 1 was changed from 50 g to 25 g.

Example 4

The navy-blue precipitate in Example 1 was recovered by filtration, thereafter 100 g of ion-exchange water and 100 g of toluene were added thereto, stirred and then left to still stand, and the solution was separated into an organic phase and an aqueous phase. Next, the aqueous phase was extracted to provide a solution of about 1% by mass PEDOT-PSS dispersed in mainly toluene.

Example 5

A solution of about 1% by mass PEDOT-PSS dispersed in methyl ethyl ketone was obtained under the same conditions as in Example 1 except that the mixed C12/C13 higher alcohol glycidyl ether in Example 1 was changed to 1,2-epoxyhexadecane.

Example 6

Methanol (100 g) and 100 g of the aqueous PEDOT-PSS solution obtained in Production Example 2 were mixed, and a mixed liquid of 100 g of methanol and 9 g of mixed C12/C13 higher alcohol glycidyl ether was dropped for 60 minutes with stirring at 50° C., to provide a navy-blue precipitate. This precipitate was recovered by filtration, and dispersed in methyl ethyl ketone, to provide a solution of about 1% by mass PEDOT-PSS dispersed in methyl ethyl ketone.

Example 7

A solution of about 1% by mass PEDOT-PSS dispersed in methyl ethyl ketone was obtained under the same conditions as in Example 6 except that the amount of methanol was changed from 100 g to 200 g and the amount of the mixed C12/C13 higher alcohol glycidyl ether was changed from 9.0 g to 12.5 g.

Example 8

A solution of about 1% by mass PEDOT-polysulfomethacrylate dispersed in methyl ethyl ketone was obtained under the same conditions as in Example 1 except that PEDOT-PSS in Example 1 was changed to a solution of PEDOT doped with polysulfoethyl methacrylate in Production Example 4, in water.

Example 9

A solution of about 1% by mass PEDOT-PSS dispersed in methyl ethyl ketone was obtained under the same conditions as in Example 1 except that the mixed C12/C13 higher alcohol glycidyl ether in Example 1 was changed to glycidyl methacrylate.

Example 10

Methanol (400 g) and 35 g of 3-glycidyl oxypropyl trimethoxysilane were mixed. Next, 0.12 g of a PEDOT-PSS solid (produced by Agfa-Gevaert Group, Orgacon DRY) freeze-dried in advance was added to the mixed liquid, and stirred at 60° C. for 2 hours. The PEDOT-PSS solid was solubilized in methanol to provide a blue methanol solution.

Example 11

While 100 g of the aqueous PEDOT-PSS solution obtained in Production Example 2 was stirred at 80° C., 25 g of 2-ethylhexyloxetane was dropped thereto for 60 minutes and thereafter stirred for 8 hours to provide a navy-blue precipitate. This precipitate was recovered by filtration, and dispersed in methanol to provide a solution of about 1% by mass PEDOT-PSS dispersed in methanol.

Comparative Example 1

To 400 g of methanol was added 0.12 g of a PEDOT-PSS solid (produced by Agfa-Gevaert Group, Orgacon DRY) freeze-dried in advance, and stirred at 60° C. for 2 hours. The PEDOT-PSS solid was not solubilized in methanol, and a precipitate was observed in a large amount.

Comparative Example 2

Methanol (100 g) and 100 g of water were mixed, and 0.12 g of a PEDOT-PSS solid (produced by Agfa-Gevaert Group, Orgacon DRY) freeze-dried in advance was added to the mixed liquid. This solution was uniformly solubilized, and turned blue. This solution was applied onto a PET film (produced by Toray Industries Inc., Lumirror® T60) by a #4 bar coater, and thereafter dried using a hot air dryer under conditions of 100° C.×1 minute. The surface resistivity of the resulting film was measured at a voltage applied of 10V using Hiresta (produced by Mitsubishi Chemical Analytech Co., Ltd.: Hiresta GP MCP-HT450).

Conductive Compositions of Examples 1 to 109 and Comparative Examples 1 and 2, and Evaluation Methods of Film Formed Using Each of Them

(1) Surface Resistivity

Each 1% solution was diluted with methyl ethyl ketone to twice its amount, and the solution diluted was applied onto a PET film (produced by Toray Industries Inc., Lumirror® T60) by a #4 bar coater, and thereafter dried using a hot air dryer under conditions of 100° C.×1 minute. The surface resistivity of the resulting film was measured at a voltage applied of 10V using Hiresta (produced by Mitsubishi Chemical Analytech Co., Ltd.: Hiresta GP MCP-HT450).

(2) Transmittance

The transmittance of the film used for measurement of the surface resistivity was measured using Haze Meter NDH5000 (manufactured by Nippon Denshoku Industries Co., Ltd.).

(3) Adhesiveness

The film used for measurement of the surface resistivity was subjected to a cross-cut peeling test using Cellophane Tape (610-1PK manufactured by 3M), and the adhesiveness thereof was evaluated by the number of cells not peeled, among 100 cells.

(4) Solution Stability

Each 1% solution was evaluated by the presence of precipitation after being left to still stand under an environment of 23° C. for 24 hours.

(5) Moisture Content

The moisture content was determined as the percent by weight of water when the total of not only an organic solvent, water and PEDOT-PSS, but also an oxirane compound or an oxetane compound, if present, was assumed to be 100% by weight. The moisture content was measured using Coulometric Karl Fischer Moisture Titrator CA-100 Model and an automatic moisture vaporization apparatus VA-124S (both produced by Mitsubishi Chemical Analytech Co., Ltd.).

<Evaluation Results>

Table 1 shows the evaluations of the solution obtained in each of Examples and Comparative Examples, and the film using the solution. Moreover, Table 2 shows the dispersibility (solution stability) of the precipitate obtained in each of Examples and Comparative Examples in various solvents. The moisture content (%) in Table 1 means the percent by weight of water in the total solution. In Table 1, "Stable" and "Precipitated" mean the state where the precipitate was not observed, and was dispersed and stabilized in the solution, and the state where the precipitate was present, and was not dispersed and stabilized in the solution, respectively.

TABLE 1

|  | Surface resistivity ($\Omega/\square$) | Moisture content (%) | Transmittance (%) | Adhesiveness | Solution stability |
| --- | --- | --- | --- | --- | --- |
| Example 1 | $2 \times 10^7$ | 0.5 | 90 | 100/100 | Stable |
| Example 2 | $3 \times 10^7$ | 0 | 90 | 100/100 | Stable |

TABLE 1-continued

| | Surface resistivity ($\Omega/\square$) | Moisture content (%) | Transmittance (%) | Adhesiveness | Solution stability |
|---|---|---|---|---|---|
| Example 3 | $8 \times 10^6$ | 0.4 | 89 | 100/100 | Stable |
| Example 4 | $1 \times 10^7$ | 2 | 89 | 100/100 | Stable |
| Example 5 | $5 \times 10^6$ | 0.2 | 90 | 20/100 | Stable |
| Example 6 | $5 \times 10^6$ | 1.6 | 89 | 5/100 | Stable |
| Example 7 | $8 \times 10^6$ | 1.2 | 90 | 16/100 | Stable |
| Example 8 | $8 \times 10^6$ | 1.2 | 89 | 100/100 | Stable |
| Example 9 | $1.2 \times 10^6$ | 0.6 | 89 | 100/100 | Precipitated |
| Example 10 | $2 \times 10^7$ | 1.5 | 89 | 100/100 | Stable |
| Example 11 | $3 \times 10^7$ | 0.8 | 89 | 100/100 | Stable |
| Comparative Example 1 | Unmeasurable | 0.8 | Unmeasurable | Unmeasurable | Precipitated |
| Comparative Example 2 | $2 \times 10^7$ | 49.4 | 89 | 0/100 | Stable |

TABLE 2

| | Methanol | MEK | Toluene |
|---|---|---|---|
| Example 1 | Not Dispersed | Dispersed | Dispersed |
| Example 2 | Not Dispersed | Dispersed | Dispersed |
| Example 3 | Not Dispersed | Dispersed | Dispersed |
| Example 4 | Not Dispersed | Dispersed | Dispersed |
| Example 5 | Not Dispersed | Dispersed | Dispersed |
| Example 6 | Dispersed | Dispersed | Not Dispersed |
| Example 7 | Not Dispersed | Dispersed | Dispersed |
| Example 8 | Not Dispersed | Dispersed | Dispersed |
| Example 9 | Not Dispersed | Dispersed | Not Dispersed |
| Example 10 | Dispersed | Not Dispersed | Not Dispersed |
| Example 11 | Dispersed | Not Dispersed | Not Dispersed |
| Comparative Example 1 | Not Dispersed | Not Dispersed | Not Dispersed |
| * Comparative Example 2 | Dispersed | Dispersed | Not Dispersed |

* When water exsists

Production of Coating Film

Example 12

To 5 g of the PEDOT-PSS solution obtained in Example 3 were added 4 g of methyl ethyl ketone, 1 g of pentaerythritol triacrylate and 0.02 g of Irgacure 127, to produce a coating material. The resulting coating material was applied onto a PET film using a #16 bar coater, dried at 100° C. for about 1 minute, and thereafter irradiated with UV light at 400 mJ by a high-pressure mercury lamp to form a coating film.

<Evaluation Results>

The coating film produced in Example 12 was excellent in transparency, and exhibited a surface resistivity of $5 \times 10^8 \Omega/\square$.

Production of Conductive Composition

Example 13

To 100 g of the aqueous PEDOT-PSS solution obtained in Production Example 2 was added 2 g of allyl glycidyl ether, and stirred at room temperature for 4 hours. Next, 200 g of methanol was added thereto and warmed to 50° C., and a solution, in which 5 g of mixed C12/C13 higher alcohol glycidyl ether was mixed with 100 g of methanol in advance, was dropped for 4 hours to provide a navy-blue precipitate. This precipitate was recovered by filtration and dispersed in methyl ethyl ketone to provide a solution of about 1% by mass of PEDOT-PSS dispersed in methyl ethyl ketone.

Example 14

A solution of about 1% by mass of PEDOT-PSS dispersed in methyl ethyl ketone was obtained under the same conditions as in Example 13 except that allyl glycidyl ether in Example 13 was changed to 3-glycidyl oxypropyl trimethoxysilane.

Example 15

To 100 g of the aqueous PEDOT-PSS solution obtained in Production Example 2 was added 100 g of methanol and warmed to 50° C., and a solution in which 2 g of propylene oxide was mixed with 50 g of methanol in advance was dropped for 4 hours. Thereafter, a solution in which 5 g of mixed C12/C13 higher alcohol glycidyl ether was mixed with 50 g of methanol in advance was dropped for 4 hours to provide a navy-blue precipitate. This precipitate was recovered by filtration and dispersed in methyl ethyl ketone to provide a solution of about 1% by mass of PEDOT-PSS dispersed in methyl ethyl ketone.

Example 16

Each solution of about 1% by mass of PEDOT-PSS dispersed in methyl ethyl ketone was obtained under the same conditions as in Example 13 except that propylene oxide in Example 15 was changed to each of materials in Table 3 and Table 4 below.

TABLE 3

| Example | Used materials |
|---|---|
| 16 | 2,3-Butylene oxide |
| 17 | Isobutylene oxide |
| 18 | 1,2-Butylene oxide |
| 19 | 1,2-Epoxyhexane |
| 20 | 1,2-Epoxyheptane |
| 21 | 1,2-Epoxypentane |
| 22 | 1,2-Epoxyoctane |
| 23 | 1,2-Epoxydecane |
| 24 | 1,3-Butadiene monoxide |
| 25 | 1,2-Epoxytetradecane |
| 26 | Glycidyl methyl ether |
| 27 | 1,2-Epoxyoctadecane |
| 28 | 1,2-Epoxyhexadecane |
| 29 | Ethyl glycidyl ether |
| 30 | Glycidyl isopropyl ether |

TABLE 3-continued

| Example | Used materials |
|---|---|
| 31 | tert-Butyl glycidyl ether |
| 32 | 1,2-Epoxyeicosane |
| 33 | 2-(Chloromethyl)-1,2-epoxypropane |
| 34 | Glycidol |
| 35 | Epichlorohydrin |
| 36 | Epibromohydrin |
| 37 | Butyl glycidyl ether |
| 38 | 1,2-Epoxy-9-decane |
| 39 | 2-(Chloromethyl)-1,2-epoxybutane |
| 40 | 2-Ethylhexyl glycidyl ether |
| 41 | 1,2-Epoxy-1H,1H,2H,2H,3H,3H-trifluorobutane |
| 42 | Tetracyanoethylene oxide |
| 43 | Glycidyl butyrate |
| 44 | 1,2-Epoxycyclooctane |
| 45 | Glycidyl methacryrate |
| 46 | 1,2-Epoxycyclododecane |
| 47 | 1-Methyl-1,2-epoxycyclohexane |
| 48 | 1,2-Epoxycyclopentadecane |
| 49 | 1,2-Epoxycyclopentane |
| 50 | 1,2-Epoxycyclohexane |
| 51 | 1,2-Epoxy-1H,1H,2H,2H,3H,3H-heptadecafluorobutane |
| 52 | 3,4-Epoxytetrahydrofuran |
| 53 | Glycidyl stearate |
| 54 | Epoxysuccinic acid |
| 55 | Glycidyl phenyl ether |
| 56 | Isophorone oxide |
| 57 | a-Pinene oxide |
| 58 | 2,3-Epoxynorbonene |
| 59 | Benzyl glycidyl ether |
| 60 | Diethoxy(3-glycidyloxypropyl)methylsilane |
| 61 | 3-[2-(Perfluorohexyl)ethoxy]-1,2-epoxypropane |
| 62 | 1,1,1,3,5,5,5-Heptamethyl-3-(3-glycidyloxypropyl)tricyclohexane |

TABLE 4

| Example | Used materials |
|---|---|
| 63 | 9,10-Epoxy-1,5-cyclododecadiene |
| 64 | Glycidyl 4-tert-butylbenzoate |
| 65 | 2,2-Bis(4-glycidyloxyphenyl)propane |
| 66 | 2-tert-Butyl-2-[2-(4-chlorophenyl)]ethyloxirane |
| 67 | Styrene oxide |
| 68 | Glycidyl trityl ether |
| 69 | 2-(3,4-Epoxycyclohexyl)ethyltrimethoxysilane |
| 70 | 2-Phenylpropyiene oxide |
| 71 | Cholesterol-5a,6a-epoxide |
| 72 | Stilbene oxide |
| 73 | Glycidyl p-toluenesulfonate |
| 74 | Ethyl 3-methyl-3-phenylglycidate |
| 75 | N-Propyl-N-(2,3-epoxypropyl)perfluoro-n-octylsulfonamide |
| 76 | (2S,3S)-1,2-Epoxy-3-(tert-butoxycarbonylamino)-4-phenylbutane |
| 77 | (R)-Glycidyl 3-nitrobenzenesulfonate |
| 78 | Glycidyl 3-nitrobenzenesulfonate |
| 79 | Parthenolide |
| 80 | N-Glycidyl phthalimide |
| 81 | Endrin |
| 82 | Dieldrin |
| 83 | 4-Glycidyloxy carbazole |
| 84 | Oxiranylmethyl 7,7-dimethyloctanoate |
| 85 | 1,7-Octadiene diepoxide |
| 86 | Neopentyl glycol diglycidyl ether |
| 87 | 4-Butanediol diglycidyl ether |
| 88 | 1,2:3,4-Diepoxybutane |
| 89 | Diglycidyl 1,2-cyclohexanedicarboxylate |
| 90 | Triglycidyl isocyanurate, neopentyl glycol diglycidyl ether |
| 91 | 1,2:3,4-Diepoxybutane |
| 92 | Polyethylene glycol #200 diglycidyl ether |
| 93 | Ethylene glycol diglycidyl ether |
| 94 | Diethylene glycol diglycidyl ether |
| 95 | Propylene glycol diglycidyl ether |
| 96 | Tripropylene glycol diglycidyl ether |
| 97 | Polypropylene glycol diglycidyl ether |
| 98 | Neopentyl glycol diglycidyl ether |
| 99 | 1,6-Hexanediol diglycidyl ether |
| 100 | Glycerin diglycidyl ether |

TABLE 4-continued

| Example | Used materials |
|---|---|
| 101 | Trimethylol propane triglycidyl ether |
| 102 | Hydrogenerated bisphenol A diglycidyl ether |
| 103 | 3-Ethyl-3-hydroxymethyloxetane |
| 104 | 2-Ethylhexyloxetane |
| 105 | (3-Ethyl-3-oxetanyl)methyl acrylate |
| 106 | (3-Ethyl-3-oxetanyl)methacrylate |
| 107 | Xylylene bisoxetane |
| 108 | 3-Ethyl-3[[(3-ethyloxetane-3-yl)methoxy]methyl]oxetane |
| 109 | 1,4-Benzenedicarboxylic acid, bis[[3-ethyl-3-oxetanyl]methyl] ester |

<Evaluation Results>

Table 5 and Table 6 show the evaluations of the solution obtained in each of Examples 13 to 109, and the film formed using the solution.

TABLE 5

| Example | Surface resistivity ($\Omega/\square$) | Moisture content (%) | Transmittance (%) | Adhesiveness | Solution stability |
|---|---|---|---|---|---|
| 13 | $1 \times 10^6$ | 0.6 | 89 | 100/100 | Stable |
| 14 | $1 \times 10^6$ | 0.5 | 90 | 100/100 | Stable |
| 15 | $2 \times 10^7$ | 0.5 | 89 | 100/100 | Stable |
| 16 | $2 \times 10^6$ | 0.6 | 89 | 100/100 | Stable |
| 17 | $2 \times 10^6$ | 0.5 | 90 | 100/100 | Stable |
| 18 | $2 \times 10^7$ | 0.5 | 89 | 100/100 | Stable |
| 19 | $3 \times 10^7$ | 0.5 | 89 | 100/100 | Stable |
| 20 | $3 \times 10^7$ | 0.5 | 90 | 100/100 | Stable |
| 21 | $2 \times 10^7$ | 0.5 | 89 | 100/100 | Stable |
| 22 | $1 \times 10^7$ | 0.5 | 89 | 100/100 | Stable |
| 23 | $1 \times 10^7$ | 0.5 | 90 | 100/100 | Stable |
| 24 | $5 \times 10^7$ | 0.5 | 90 | 100/100 | Stable |
| 25 | $2 \times 10^7$ | 0.4 | 90 | 100/100 | Stable |
| 26 | $2 \times 10^7$ | 0.5 | 90 | 100/100 | Stable |
| 27 | $2 \times 10^7$ | 0.5 | 88 | 100/100 | Stable |
| 28 | $1 \times 10^7$ | 0.7 | 88 | 100/100 | Stable |
| 29 | $1 \times 10^7$ | 0.5 | 90 | 100/100 | Stable |
| 30 | $5 \times 10^6$ | 0.5 | 90 | 100/100 | Stable |
| 31 | $1 \times 10^7$ | 0.2 | 90 | 100/100 | Stable |
| 32 | $1 \times 10^7$ | 0.5 | 90 | 100/100 | Stable |
| 33 | $1 \times 10^7$ | 0.5 | 89 | 100/100 | Stable |
| 34 | $1 \times 10^7$ | 0.5 | 90 | 100/100 | Stable |
| 35 | $1 \times 10^7$ | 0.5 | 90 | 100/100 | Stable |
| 36 | $4 \times 10^7$ | 0.5 | 89 | 100/100 | Stable |
| 37 | $1 \times 10^7$ | 0.5 | 89 | 100/100 | Stable |
| 38 | $2 \times 10^7$ | 0.5 | 90 | 100/100 | Stable |
| 39 | $2 \times 10^7$ | 0.5 | 89 | 100/100 | Stable |
| 40 | $8 \times 10^6$ | 0.5 | 89 | 100/100 | Stable |
| 41 | $8 \times 10^6$ | 0.5 | 88 | 100/100 | Stable |
| 42 | $4 \times 10^6$ | 0.5 | 89 | 100/100 | Stable |
| 43 | $4 \times 10^6$ | 0.7 | 89 | 100/100 | Stable |
| 44 | $6 \times 10^6$ | 0.5 | 88 | 100/100 | Stable |
| 45 | $2 \times 10^6$ | 0.8 | 89 | 100/100 | Stable |
| 46 | $6 \times 10^6$ | 0.2 | 89 | 100/100 | Stable |
| 47 | $6 \times 10^6$ | 0.4 | 89 | 100/100 | Stable |
| 48 | $4 \times 10^6$ | 0.4 | 89 | 100/100 | Stable |
| 49 | $4 \times 10^6$ | 0.5 | 89 | 100/100 | Stable |
| 50 | $4 \times 10^6$ | 0.7 | 89 | 100/100 | Stable |
| 51 | $7 \times 10^6$ | 0.2 | 89 | 100/100 | Stable |
| 52 | $6 \times 10^6$ | 0.6 | 89 | 100/100 | Stable |
| 53 | $7 \times 10^6$ | 0.6 | 88 | 100/100 | Stable |
| 54 | $2 \times 10^7$ | 0.6 | 89 | 100/100 | Stable |
| 55 | $1 \times 10^7$ | 0.6 | 89 | 100/100 | Stable |
| 56 | $1 \times 10^7$ | 0.5 | 90 | 100/100 | Stable |
| 57 | $1 \times 10^7$ | 0.5 | 90 | 100/100 | Stable |
| 58 | $1 \times 10^7$ | 0.5 | 90 | 100/100 | Stable |
| 59 | $7 \times 10^6$ | 0.6 | 90 | 100/100 | Stable |
| 60 | $2 \times 10^7$ | 0.6 | 89 | 100/100 | Stable |
| 61 | $8 \times 10^6$ | 0.6 | 89 | 100/100 | Stable |
| 62 | $9 \times 10^6$ | 0.6 | 90 | 100/100 | Stable |

TABLE 6

| Example | Surface resistivity (Ω/□) | Moisture content (%) | Transmittance (%) | Adhesiveness | Solution stability |
|---|---|---|---|---|---|
| 63 | $2 \times 10^7$ | 0.6 | 89 | 100/100 | Stable |
| 64 | $9 \times 10^6$ | 0.6 | 89 | 100/100 | Stable |
| 65 | $8 \times 10^6$ | 0.5 | 90 | 100/100 | Stable |
| 66 | $9 \times 10^6$ | 0.5 | 89 | 100/100 | Stable |
| 67 | $6 \times 10^6$ | 0.3 | 89 | 100/100 | Stable |
| 68 | $4 \times 10^6$ | 0.4 | 89 | 100/100 | Stable |
| 69 | $2 \times 10^7$ | 0.2 | 89 | 100/100 | Stable |
| 70 | $1 \times 10^7$ | 0.6 | 89 | 100/100 | Stable |
| 71 | $1 \times 10^7$ | 0.5 | 89 | 100/100 | Stable |
| 72 | $1 \times 10^7$ | 0.5 | 89 | 100/100 | Stable |
| 73 | $1 \times 10^7$ | 0.6 | 88 | 100/100 | Stable |
| 74 | $1 \times 10^7$ | 0.5 | 89 | 100/100 | Stable |
| 75 | $2 \times 10^7$ | 0.5 | 89 | 100/100 | Stable |
| 76 | $1 \times 10^7$ | 0.5 | 90 | 100/100 | Stable |
| 77 | $1 \times 10^7$ | 0.5 | 90 | 100/100 | Stable |
| 78 | $1 \times 10^7$ | 0.5 | 90 | 100/100 | Stable |
| 79 | $2 \times 10^7$ | 0.5 | 89 | 100/100 | Stable |
| 80 | $2 \times 10^7$ | 0.5 | 90 | 100/100 | Stable |
| 81 | $2 \times 10^7$ | 0.5 | 89 | 100/100 | Stable |
| 82 | $1 \times 10^7$ | 0.5 | 89 | 100/100 | Stable |
| 83 | $1 \times 10^7$ | 0.5 | 90 | 100/100 | Stable |
| 84 | $1 \times 10^7$ | 0.5 | 89 | 100/100 | Stable |
| 85 | $1 \times 10^7$ | 0.7 | 89 | 100/100 | Stable |
| 86 | $1 \times 10^7$ | 0.5 | 90 | 100/100 | Stable |
| 87 | $1 \times 10^7$ | 0.5 | 89 | 100/100 | Stable |
| 88 | $1 \times 10^7$ | 0.2 | 89 | 100/100 | Stable |
| 89 | $1 \times 10^7$ | 0.5 | 90 | 100/100 | Stable |
| 90 | $1 \times 10^7$ | 0.4 | 89 | 100/100 | Stable |
| 91 | $1 \times 10^7$ | 0.5 | 90 | 100/100 | Stable |
| 92 | $3 \times 10^7$ | 0.5 | 89 | 100/100 | Stable |
| 93 | $1 \times 10^7$ | 0.5 | 89 | 100/100 | Stable |
| 94 | $1 \times 10^7$ | 0.5 | 90 | 100/100 | Stable |
| 95 | $1 \times 10^7$ | 0.5 | 89 | 100/100 | Stable |
| 96 | $1 \times 10^7$ | 0.5 | 89 | 100/100 | Stable |
| 97 | $1 \times 10^7$ | 0.5 | 90 | 100/100 | Stable |
| 98 | $2 \times 10^7$ | 0.5 | 89 | 100/100 | Stable |
| 99 | $5 \times 10^7$ | 0.5 | 89 | 100/100 | Stable |
| 100 | $3 \times 10^7$ | 0.5 | 89 | 100/100 | Stable |
| 101 | $4 \times 10^7$ | 0.5 | 89 | 100/100 | Stable |
| 102 | $4 \times 10^7$ | 0.4 | 89 | 100/100 | Stable |
| 103 | $4 \times 10^7$ | 0.4 | 89 | 100/100 | Stable |
| 104 | $6 \times 10^7$ | 0.7 | 89 | 100/100 | Stable |
| 105 | $7 \times 10^7$ | 0.6 | 88 | 100/100 | Stable |
| 106 | $3 \times 10^7$ | 0.5 | 89 | 100/100 | Stable |
| 107 | $2 \times 10^7$ | 0.5 | 89 | 100/100 | Stable |
| 108 | $1 \times 10^7$ | 0.5 | 90 | 100/100 | Stable |
| 109 | $1 \times 10^7$ | 0.5 | 90 | 100/100 | Stable |

The water-insoluble reaction product (precipitate) obtained in Example 1 was dissolved in methyl ethyl ketone, and a coating product thereof had a resistivity of $2 \times 10^7 \Omega/\square$. In addition, a dispersion liquid of about 1% by mass of PEDOT-PSS, in which this precipitate was dissolved in MEK, was diluted with twice its amount of distilled water, and the pH was measured by a simple pH meter AS212 (manufactured by Horiba Ltd.) and was found to be 6.1. On the other hand, to the dispersion liquid of 1.2% by mass of PEDOT-PSS, obtained in Production Example 2, was added twice its amount of distilled water, and the pH was measured in the same manner and was found to be 1.8. It can be seen from this that the precipitate was obtained by reacting at least a polyanion and an epoxy compound. All the precipitates obtained in Examples 13 to 109 were each dispersed in methanol and methyl ethyl ketone, but not dispersed in toluene. It was found from the same measurement as in the above measurement that each of the precipitates obtained in Examples 2 to 11 and Examples 13 to 109 was also a product derived from a reaction of an anion with an oxirane group and/or oxetane group-containing organic compound.

It was found out from Tables 1 to 6 that the conductive composition obtained in the present invention, even when including a small amount of moisture, is easily dispersible in an organic solvent including methyl ethyl ketone with maintaining its performances such as conductivity and transparency, by change of a substituent connected to a glycidyl group, as compared with a conventional water dispersion. In addition, the conductive composition obtained in the present Example can have a low moisture content or include no moisture at practical level to thereby have compatibility with a hydrophobic resin.

INDUSTRIAL APPLICABILITY

The present invention can be effectively utilized for peeling paper, an antistatic film, a conductive coating material, a touch screen, an organic LED, organic EL, a lithium secondary battery, an organic thin film solar battery, a conductive polymer fiber, and the like.

What is claimed is:

1. A method for producing a conductive composition comprising:
    (a) a π-conjugated conductive polymer,
    (b) a polyanion with which the π-conjugated conductive polymer is doped, and
    (c) a reaction product of an oxirane group and/or oxetane group-containing organic compound and an anion, the anion being non-doped with the π-conjugated conductive polymer (a) in anions in the polyanion with which the π-conjugated conductive polymer (a) is doped,
  wherein the conductive composition is dispersed in a solvent containing a first organic solvent and water,
  the method comprising:
  adding the oxirane group and/or oxetane group-containing organic compound with a second organic solvent to a water dispersion of the π-conjugated conductive polymer and the polyanion with which the polymer is doped,
  reacting the polyanion and the oxirane group and/or oxetane group-containing organic compound with the anion being non-doped with the π-conjugated conductive polymer,
  collecting the conductive composition precipitated thereby,
  adding the solvent containing the first organic solvent and water to the collected conductive composition,
  separating the solvent including the collected conductive composition into an organic phase and an aqueous phase, and
  extracting the aqueous phase.

2. The method of claim 1, further comprising adding a resin that is soluble in the first organic solvent.

3. The method of claim 1, wherein the π-conjugated conductive polymer has one or more repeating units selected from the group consisting of polypyrroles, polythiophenes, polyacetylenes, polyphenylenes, polyphenylenevinylenes, polyanilines, polyacenes, polythiophenevinylenes, and copolymers of two or more thereof.

4. The method of claim 3, wherein the π-conjugated conductive polymer is poly(3,4-ethylenedioxythiophene) or polypyrrole.

5. The method of claim 1, wherein the polyanion comprises one or a mixture of two or more selected from a sulfonic acid group, a phosphoric acid group and a carboxyl group.

6. The method of claim 1, wherein the polyanion comprises polystyrenesulfonic acid, polyvinylsulfonic acid, polyacryloyloxy-alkylenesulfonic acid, poly(2-acrylamido- 2-methyl-1-propanesulfonic acid), or one or more thereof as a copolymerization constituent.

7. The method of claim 1, wherein the oxirane group and/or oxetane group-containing organic compound is added in the range of 1.0 to 30.0 in a weight ratio relative to the anion group in the polyanion of the π-conjugated conductive polymer with the second organic solvent to the water dispersion.

* * * * *